J. KUSHNIER.
TROLLEY WHEEL AND FROG.
APPLICATION FILED MAY 27, 1922.

1,434,293.

Patented Oct. 31, 1922.

J. Kushnier
INVENTOR

BY Victor J. Evans
ATTORNEY

Patented Oct. 31, 1922.

1,434,293

UNITED STATES PATENT OFFICE.

JOHN KUSHNIER, OF AVELLA, PENNSYLVANIA.

TROLLEY WHEEL AND FROG.

Application filed May 27, 1922. Serial No. 564,193.

*To all whom it may concern:*

Be it known that I, JOHN KUSHNIER, a citizen of Czecho-Slovakia, residing at Avella, in the county of Washington and State of Pennsylvania, have invented new and useful Improvements in Trolley Wheels and Frogs, of which the following is a specification.

This invention relates to a trolley wheel and frog, and more particularly to a wheel and frog provided with co-operating means for preventing the wheel from leaving the trolley wire when the car is passing a crossing or making a turn.

One of the main objects of the invention is to provide a trolley wheel and frog having means of simple construction and efficient operation which effectually prevent the wheel from jumping from the trolley. A further object is to provide means of the character stated of simple construction and operation which may be produced and installed at comparatively small cost. Further objects will appear from the detailed description.

In the drawings:—

Figure 1:
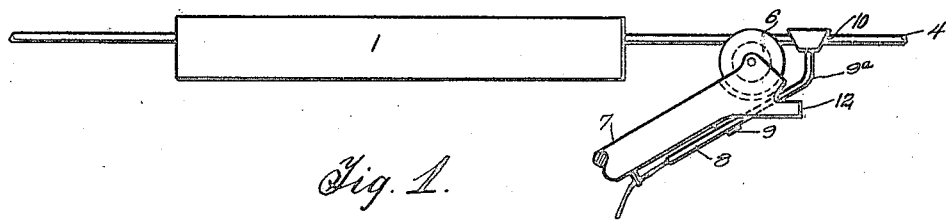
Figure 1 is a side view of the frog and trolley wheel.
Figure 2:
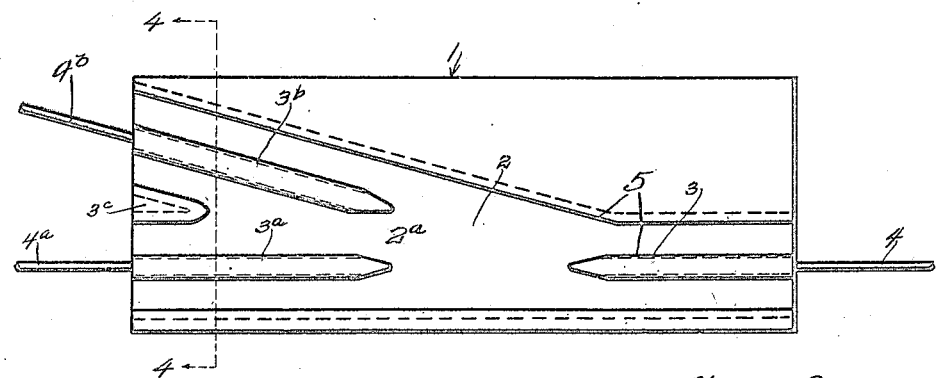
Figure 2 is an underneath view of the frog.

The frog includes a block 1 provided in its underface with a channel 2 which flares toward one end. In the narrower end of channel 2 there is a rib 3 to which is secured trolley wire 4. In the flaring portion of channel 2 there is provided a rib $3^a$ which is disposed in alignment with rib 3 and to which is secured a trolley wire $4^a$. A second rib $3^b$ is provided in flaring portion $2^a$ of channel 2 and is disposed at an angle to rib $3^a$. An inwardly tapering guide finger $3^c$ is positioned between the ribs $3^a$ and $3^b$. The lateral walls of channel 2 and the flared portion $2^a$ of the channel are inclined downwardly and inwardly of the block, and the lateral faces of the ribs 3, $3^a$ and $3^b$ and finger $3^c$ are inclined so as to form with each other and with the lateral walls of the channel a plurality of downwardly converging slots or passages adapted for reception of frusto-conical guiding and retaining wheels carried by a trolley pole, to be described.

A trolley wheel 6 is rotatably mounted in the upper end of a trolley pole 7 on the underface of which are mounted two rods 8 which are pivotally secured to each other and to the trolley pole at 9. Each of these rods is provided, at its upper end, with an upwardly extending arm $9^a$ on which is rotatably mounted a retaining and guide wheel 10 of inverted frusto-conical shape. The upper ends of rods 8 are forced toward each other by springs 11 which are positioned inside of inwardly projecting guard fingers 12 formed on the trolley pole. As trolley wheel 6 enters the block the wheels 10 engage into the downwardly tapering groove formed by the downwardly and inwardly inclined lateral walls 5 of block 1 and rib 3. If the car continues to travel straight ahead, the wheels 10 enter into the passages or slots formed by the lateral wall of block 1 and the adjacent wall of rib $3^a$ and the lateral wall of finger $3^c$ and the adjacent wall of rib $3^a$. This serves to effectually prevent the trolley wheel from jumping off of the wire as it enters into and passes through block 1. As wheels 10 are positioned in rear of trolley wheel 6 and normally engage over the trolley wire, they also serve to prevent the trolley wheel from leaving the wire. A trolley wire $4^b$ is secured to rib $3^b$, this rib being provided to permit the trolley wheel to make a turn as when the car travels about a curve. The operation of the device in this case will be the same as that previously described. As will be understood, the rib $3^c$ may be placed at either side of the block depending upon in which direction the turn is to be made and, if desired, there may be two ribs provided one at each side of the rib $3^a$.

To permit the pole to be lowered when trolley wheel 6 is not in block 1, I provide means whereby the retaining and guide wheels 10 may be moved away from each other for disengaging the same from contact with the trolley wire. For this purpose an eye 14 is secured to trolley pole 7 and through which is trained a cord 13. A pair of converging cords 15 have their far ends secured to the ends of the rod opposite to the wheels 10. The rods 8 are bent intermediate of their ends so as to provide angular portions at their points of pivotal connection.

Figure 3:
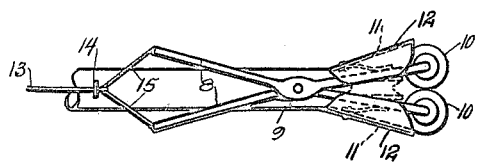
Figure 3 is an underneath view of the trolley pole and associated parts.
Figure 4:
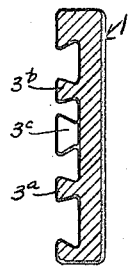
Figure 4 is a section taken substantially on line 4—4 of Figure 2.
Figure 5:
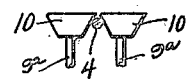
Figure 5 is a detail of the guiding and retaining wheels engaging over the trolley wire.

This manner of connection provides for arranging the opposite ends of each rod upon the same side of the longitudinal center of the trolley pole 7 or as clearly shown in Figure 3 of the drawings, therefore it is obvious that by pulling on cord 13 the lower ends of the rods are forced together, thus moving the guiding and retaining wheels 10 away from each other out of engagement with the trolley wire.

What I claim is:—

1. In a device of the character described, a block provided with a channel in its underface, the side walls of the channel being under-cut, ribs in said channel, wires secured to said ribs, a trolley pole, a trolley wheel carried by said pole and adapted for engagement with said wires and the ribs, and guiding and retaining members carried by the pole and positioned and adapted for engagement with the undercut walls of the channel.

2. In a device of the character described, a block provided with a channel in its underface, the side walls of the channel being undercut, ribs in said channel, wires secured to said ribs, a trolley pole, a trolley wheel carried by said pole and adapted for engagement with said wires and the ribs, guiding and retaining members carried by the pole and positioned and adapted for engagement with the undercut walls of the channel, and means for forcing said members away from each other.

3. In a device of the character described, a block provided with a channel in its underface, the side walls of the channel being inclined downwardly and inwardly of the block, ribs in said channel, wires secured to said ribs, a trolley pole, a trolley wheel carried by said pole and adapted for engagement with said wires and the ribs, and guiding and retaining members of inverted frusto-conical shape rotatably mounted on the pole and positioned for engagement with the inclined side walls of the channel.

4. In a device of the character described, a block provided with a channel in its underface, the side walls of the channel being inclined downwardly and inwardly of the block, ribs in said channel, wires secured to said ribs, a trolley pole, a trolley wheel carried by said pole and adapted for engagement with said wires and the ribs, rods pivotally mounted on the pole, inverted frusto-conical members rotatably mounted on said rods and positioned for engagement with the inclined walls of the channel, and means for forcing the rods toward each other.

In testimony whereof I affix my signature.

JOHN KUSHNIER.